(12) United States Patent
Le Cras et al.

(10) Patent No.: US 10,989,144 B2
(45) Date of Patent: Apr. 27, 2021

(54) INJECTION ELEMENT HAVING AN IGNITION DEVICE

(71) Applicant: ARIANEGROUP SAS, Paris (FR)

(72) Inventors: Jean-Luc Le Cras, Saint Marcel (FR); Laurent Gomet, Houlbec-Cocherel (FR)

(73) Assignee: ARIANEGROUP SAS, Paris (FR)

( * ) Notice: Subject to any disclaimer, the term of this patent is extended or adjusted under 35 U.S.C. 154(b) by 137 days.

(21) Appl. No.: 16/073,180

(22) PCT Filed: Jan. 26, 2017

(86) PCT No.: PCT/FR2017/050179
§ 371 (c)(1),
(2) Date: Jul. 26, 2018

(87) PCT Pub. No.: WO2017/129908
PCT Pub. Date: Aug. 3, 2017

(65) Prior Publication Data
US 2019/0032606 A1    Jan. 31, 2019

(30) Foreign Application Priority Data

Jan. 29, 2016 (FR) ...................................... 1650713

(51) Int. Cl.
*F02K 9/52* (2006.01)
*F02K 9/95* (2006.01)
(Continued)

(52) U.S. Cl.
CPC .................. *F02K 9/52* (2013.01); *F02K 9/95* (2013.01); *B64G 1/401* (2013.01); *B64G 1/402* (2013.01);
(Continued)

(58) Field of Classification Search
CPC ..... F02K 9/44; F02K 9/42; F02K 9/52; F02K 9/95; F02K 9/46; F02K 9/48; F02C 7/26;
(Continued)

(56) References Cited

U.S. PATENT DOCUMENTS 3,057,159 A * 10/1962 Benedict ................... F02K 9/95
60/39.827
3,073,122 A * 1/1963 Ledwith ..................... F02K 9/95
60/39.821
(Continued)

FOREIGN PATENT DOCUMENTS

FR    2 269 646 A1    11/1975
FR    2 914 368 A1    10/2008
(Continued)

OTHER PUBLICATIONS

International Search Report dated Apr. 20, 2017 in PCT/FR2017/050179 filed Jan. 26, 2017.
(Continued)

*Primary Examiner* — William H Rodriguez
(74) *Attorney, Agent, or Firm* — Obion, McClelland, Maier & Neustadt, L.L.P.

(57) ABSTRACT

An injector element for injecting a mixture of at least a first propellant and a second propellant into a combustion chamber. The injector element includes a first tubular wall defining a first duct for injecting the first propellant, and a second wall surrounding the first wall and defining, between the first and second walls, a second duct for injecting the second propellant. The first wall includes a first electrode for igniting the mixture by electric discharge.

8 Claims, 2 Drawing Sheets

(51) Int. Cl.
*F02K 9/44* (2006.01)
*F02K 9/46* (2006.01)
*F02K 9/48* (2006.01)
*F02K 9/42* (2006.01)
*F02K 9/50* (2006.01)
*B64G 1/40* (2006.01)

(52) U.S. Cl.
CPC ............... *F02K 9/42* (2013.01); *F02K 9/44* (2013.01); *F02K 9/46* (2013.01); *F02K 9/48* (2013.01); *F02K 9/50* (2013.01)

(58) Field of Classification Search
CPC .......... F02C 7/264; F02C 7/266; F23D 14/64; B64G 1/401; B64G 1/402
See application file for complete search history.

(56) References Cited

U.S. PATENT DOCUMENTS

| | | | | |
|---|---|---|---|---|
| 3,878,418 A | * | 4/1975 | Meyer | ............... H01T 13/54 313/118 |
| 4,023,351 A | * | 5/1977 | Beyler | ............... F02C 7/266 60/742 |
| 5,636,511 A | * | 6/1997 | Pfefferle | ............... F01N 3/18 431/268 |
| 9,423,133 B2 | * | 8/2016 | Gomez del Campo | ............... F23C 99/001 |
| 2004/0231318 A1 | | 11/2004 | Fisher | |
| 2009/0320447 A1 | | 12/2009 | Fisher | |
| 2010/0107602 A1 | * | 5/2010 | Valentian | ............... F02K 9/95 60/258 |
| 2014/0045128 A1 | * | 2/2014 | Lee | ............... F23D 14/64 431/354 |
| 2015/0323187 A1 | * | 11/2015 | Gomez del Campo | ............... F23R 3/286 60/776 |

FOREIGN PATENT DOCUMENTS

| | | | |
|---|---|---|---|
| FR | 2974151 | * | 4/2011 |
| GB | 862148 | | 3/1961 |

OTHER PUBLICATIONS

European Office Action dated Jul. 2, 2020 in European Patent Application No. 17 706 575.2, 7 pages.

* cited by examiner

INJECTION ELEMENT HAVING AN IGNITION DEVICE

FIELD OF THE INVENTION

The present disclosure relates to an injector element for injecting a mixture of two propellants into a combustion chamber, and designed more particularly for a rocket engine with at least one combustion chamber of the type that includes such an injector element. The present disclosure relates more particularly to an improvement made to such an injector element in order to facilitate igniting of the mixture of propellants.

TECHNOLOGICAL BACKGROUND

Patent application FR 2 974 151 A1 describes an injector element for injecting a mixture of at least a first propellant and a second propellant into a combustion chamber. The injector element comprises a first tubular wall defining a first duct for injecting the first propellant, and a second wall surrounding the first wall and defining, between the first and second walls, a second duct for injecting the second propellant.

Patent application FR 2 974 151 A1 describes embodiments in which the injector element also includes a central body. The central body includes a device for igniting the mixture such that the ignition function is integrated in the injector element. Nevertheless, none of those examples provides entire satisfaction from the point of view of optimizing ignition of the mixture of propellants in order to initiate combustion. The invention thus seeks to propose an injector element in which ignition of the mixture of propellants is optimized.

SUMMARY OF THE INVENTION

This object is achieved by the fact that the first wall comprises a first electrode for igniting the mixture by electric discharge.

The first wall may comprise the first electrode in combination with other elements or it may, as a whole, form the first electrode.

By means of this provision, combustion is initiated in the vicinity of the first electrode, specifically in the vicinity of the first wall. Thus, the flame that is generated can become attached directly on the first wall, which is located at the intersection between the first propellant duct and the second propellant duct. Combustion is initiated in a zone where the propellants are traveling at low speed so it becomes stabilized more quickly; furthermore, since the energy for ignition is delivered immediately upstream from the zone where the propellants mix together, this is correspondingly more favorable to the flame becoming attached quickly on the first wall.

The first and/or second wall may be cylindrical on a base of any shape, in particular of circular or polygonal shape, or it may be annular or frustoconical.

In some embodiments, the injector element includes a central body situated in the first duct, the first wall surrounding the central body. The presence of a central body makes the injector element much easier to fabricate.

In some embodiments, the central body has a second electrode for igniting the mixture by electric discharge.

Alternatively, in some embodiments, the second wall includes a second electrode for igniting the mixture by electric discharge. In these embodiments, the presence of a central body in the injector element is optional.

Together with the first electrode, the second electrode forms an electrical breakdown system for igniting the mixture of propellants, i.e. an ignition device operating by delivering energy directly to the mixture of propellants.

In some embodiments, a downstream end of the second electrode is situated downstream in the propellant injection direction from a downstream end of the first electrode. Thus, the location of the breakdown is controlled more accurately. In addition, the relative position of the electrodes makes it possible to adjust as desired the location of the breakdown as a function of need, insofar as the breakdown takes place along a straight line segment of shortest distance between the facing conductive surfaces of the two electrodes.

In some embodiments, the first electrode is a ground electrode. The propagation direction of the breakdown spark can be adjusted by selecting the polarities of the two electrodes. Depending on the materials used, one or the other of the ground electrode and the charged electrode may be more favorable to good attachment of the flame.

In some embodiments, an end of the second electrode that is downstream, in the propellant injection direction is plane transversely to the injection direction. This simplifies construction thereof. Alternatively, the downstream end may be of any shape configured to reduce fluid recirculation at the downstream end of the second electrode and thereby lengthen its lifetime.

In some embodiments, the first duct and/or the second duct present a shape converging towards downstream from the injector element.

The present disclosure also provides an injection head or injector having a plurality of injector elements as described above.

The present disclosure also provides a combustion chamber including at least one injector as described above or a plurality of injector elements as described above.

The present disclosure also provides a rocket engine comprising at least one combustion chamber as described above.

In certain embodiments, the first propellant is an oxidizer. Thus, when the central body comprises a charged electrode forming a second electrode, this electrode is in the oxidizing flow and is protected from the combustion. The lifetime of the rocket engine ignition system is thus lengthened.

BRIEF DESCRIPTION OF THE DRAWINGS

The invention and its advantages can be better understood on reading the following detailed description of embodiments of the invention given as non-limiting examples. The description refers to the accompanying drawings, in which.

DETAILED DESCRIPTION OF THE INVENTION

Figure 1:
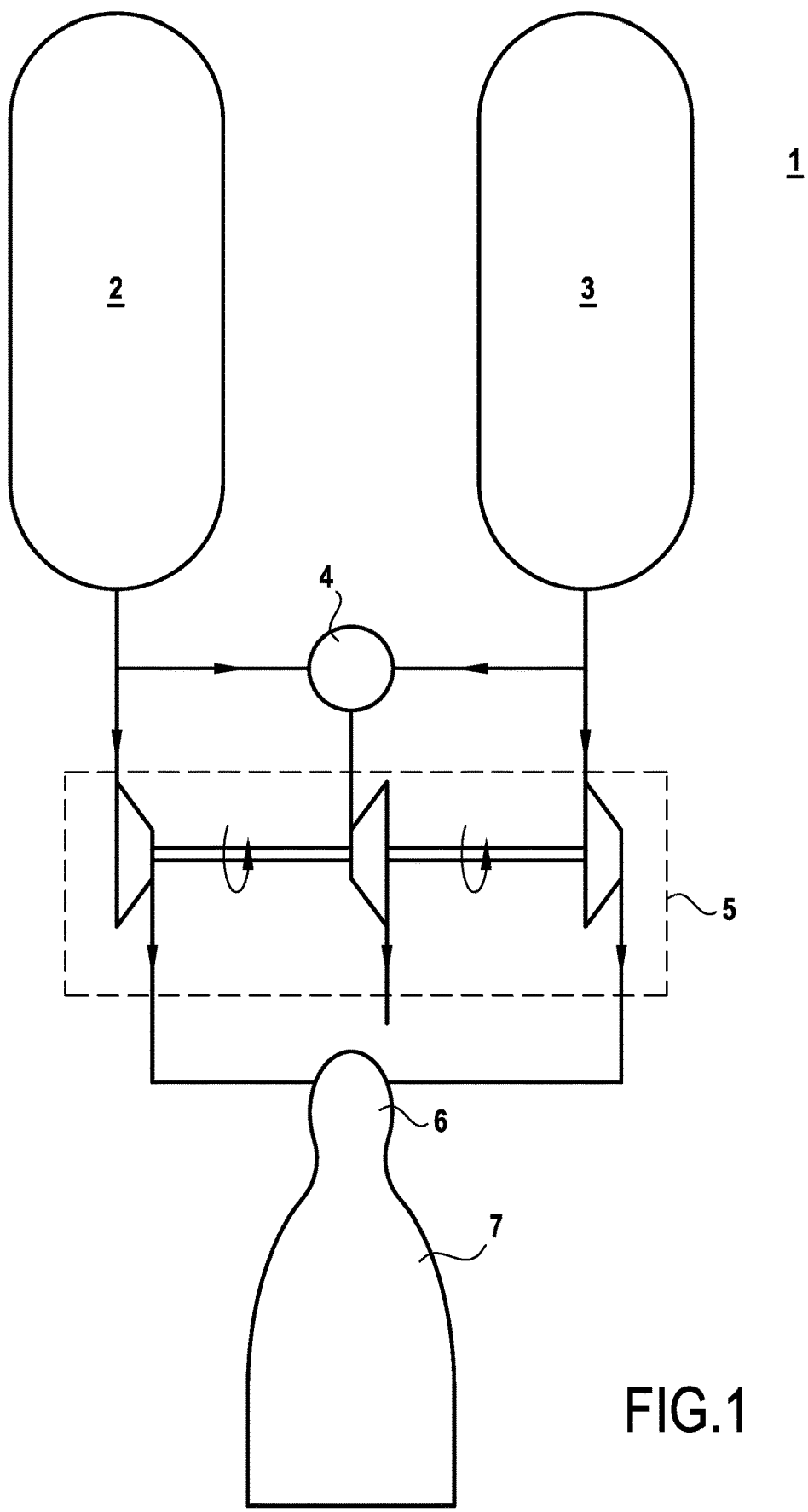
FIG. 1 is a diagrammatic view of a liquid propellant rocket engine.

FIG. 1 is a diagram showing a rocket engine 1 having liquid propellants, in particular cryogenic liquid propellants. The rocket engine 1 has a tank 2 for the first propellant, a tank 3 for the second propellant, a gas generator 4 fed with the first and second propellants, a turbopump 5 driven by the combustion gas coming from the gas generator 4, a main combustion chamber 6 fed with propellants by the turbopump 5, and a convergent-divergent nozzle 7 for propulsive ejection of the combustion gas generated in the main combustion chamber 6.

In order to obtain effective combustion both in the gas generator 4 and in the main combustion chamber 6, those components include injector members for injecting propellant to enable the propellants to be mixed together and distributed uniformly. Typically, the injector members are in the form of injectors, each comprising an injector plate having a plurality of injector elements distributed therein for injecting the two propellants in an axisymmetric configuration.

Figure 2:
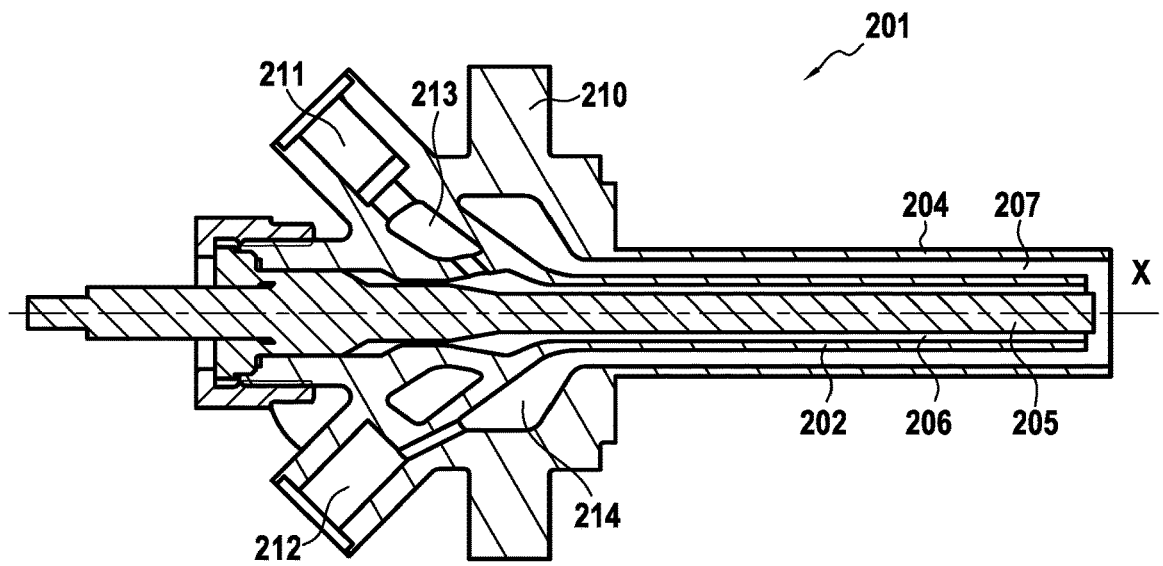
FIG. 2 is a longitudinal section of an injector element in a first embodiment.

FIG. 2 is a longitudinal section of an injector element of coaxial structure for injecting and mixing together two propellants E1 and E2. In this embodiment, the injector element 201 is made up of a plurality of parts, so it can be disassembled. Nevertheless, the injector element 201 could equally well be made as a single part out of material that is continuous. For example, the injector element 201 could be made by additive manufacturing, which makes it possible to make shapes that are complex and to obtain single-piece parts made out of continuous material and of dimensions that are optimized. The injector element 201 may optionally be made out of material that is continuous with the injector of the combustion chamber to which it belongs. As in the present embodiment, the injector element 201 may present an axis of symmetry X, at least in its downstream portion, which axis is also the main flow axis of the propellants E1 and E2.

Figure 3:
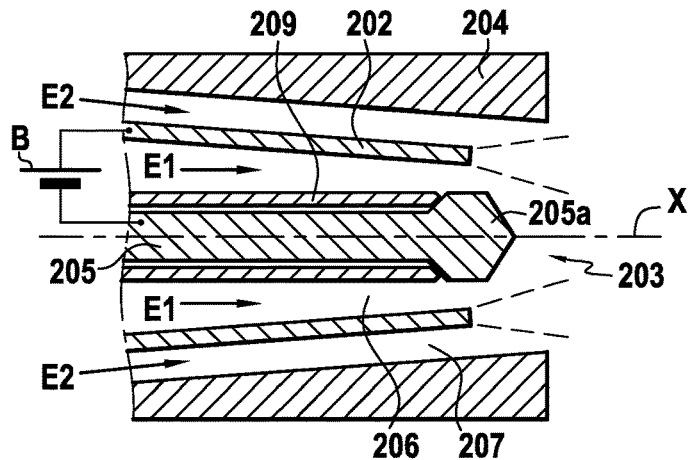
FIG. 3 is a fragmentary longitudinal section of an injector element in a first embodiment.

FIG. 3 is a detail view of one end of an injector element in a first embodiment. As shown, the injector element 201 comprises, in its terminal portion, two coaxial walls 202 and 204 around a central body 203 so as to form first and second ducts 206 and 207.

In this embodiment, the first wall 202 is frustoconical. The second wall 204 is defined by a radially inner surface that is frustoconical and by a radially outer surface that is cylindrical. In a variant, the second wall 204 could be defined by two frustoconical surfaces. The first duct 206 and the second duct 207 are of a shape that converges going downstream from the injector element 201. Thus, the architecture of the injector element 201 is made compact in the vicinity of its end where electric breakdown and spark generation take place. In this way, the injector element is made easier to integrate in an injector head having a plurality of injector elements.

The central body 203 has a conductive core 205 surrounded by an insulating sheath 209. One end 205a of the core 205 projects from the end of the sheath 209. The end 205a has a distal portion that is substantially conical in shape. The end 205a is thus designed to reduce any recirculation in the wake of the electrode, thereby increasing its lifetime.

A setback may be defined between the end of the outer shell, i.e. the second wall (outer wall) 204 and the first wall 202 (inner wall). The second wall 204 may form part of the injector plate 210 itself (shown in part only).

The injector element 201 further includes a first propellant feed 211 and a second propellant feed 212, which feeds open out respectively into first and second cavities 213 and 214, which cavities are annular in this example and suitable for feeding the first and second ducts 206 and 207, respectively.

The first duct 206 is configured to inject the first propellant E1, while the second duct 207, radially adjacent to the outside of the first duct 206, is configured to inject the second propellant E2. Since the first and second propellants E1 and E2 are injected at different speeds while the injector element 201 is in operation, shear within the stream of the second propellant E2 in the setback gives rise to turbulence in the streams of both propellants E1 and E2, thereby ensuring that the two propellants E1 and E2 are mixed together uniformly.

Ignition by the injector element 201 is described below in detail with reference to FIG. 3, which describes in detail the ignition zone of the injector element 201.

As mentioned above, the first wall 202 has a first electrode for igniting the mixture by electric discharge. In the embodiment of FIG. 3, the central body 203 has a second electrode for igniting the mixture by electric discharge. The first and second electrodes are connected to opposite poles of a source B of electricity so as to generate an electric discharge in order to deliver directly energy for igniting the mixture and initiating it. Given the configuration of the first wall 202 and of the central body 205, it can be understood that the electric discharge is generated between the central body 205, more particularly its downstream end 205a, and the downstream end of the first electrode, in this example the downstream end of the first wall 202. Thus, the first electrode, the second electrode, and the source B of electricity form an ignition device for igniting the mixture of propellants by direct delivery of energy, specifically a spark. Because the first wall 202 comprises an electrode, in this example the ground electrode, the energy of the spark is located in the wake of the first wall 202. More precisely, and as explained above, the spark or electric discharge is generated immediately upstream from the mixing zone between the first and second propellants, and thus in the first propellant, and the energy delivered by the spark is deposited directly in said mixing zone, which, as can be seen in FIG. 3, is located in the wake of the first wall 202. This energy sublimes a portion of the material of the first wall 202 and creates a plasma and radicals that are combustion precursors in the propellant-mixing zone. Consequently, the energy released by the ignition device is deposited directly into the zone where the two propellants E1 and E2 are mixed together, which zone is highly turbulent and presents an overall speed that is relatively small in the direction X, thereby significantly improving the stability and the attachment of the flame in order to ignite the mixture. In other words, and as can be understood from FIG. 3, the flame that results from igniting the mixture of propellants becomes attached on the downstream end of the first wall 202, also referred to as a "lip", which corresponds in this embodiment to the downstream end of the first electrode.

Thus, in order to trigger the operation of a combustion chamber having an injector with a plurality of injector elements including at least one injector element 201 of the kind shown in FIGS. 2 and 3, said first and second propellants E1 and E2 are initially injected into the combustion chamber, the first propellant E1 being injected via the first duct 206 and the second propellant E2 being injected via the second duct 207. Downstream from the ducts 206 and 207, said first and second propellants mix together as a result of turbulence between the two propellants E1 and E2. In order to ignite that mixture, the source B of electricity is activated, thereby creating a spark that delivers energy to the mixture and that causes it to ignite. Once the mixture of propellant has ignited, the voltage between the first electrode of the first wall 202 and the second electrode of the central body 203 may drop to zero, so that the injector element 201 then performs only its injection function. Thereafter, ignition takes place in the entire chamber as a result of interaction between the flame from the injector element 201 and the other injectors, in the same manner as for a conventional igniter.

The first propellant E1 may be an oxidizer, thereby protecting the charged electrode contained in the central body 203 once the propellant mixture has been ignited and combustion initiated. In another use, the first propellant E1 may be a reducing propellant. The electrode would likewise be protected. The first propellant E1 may be selected as the more dense of the two propellants in use, thereby ensuring a flow that is more stable and mixing that is better.

Figure 4:
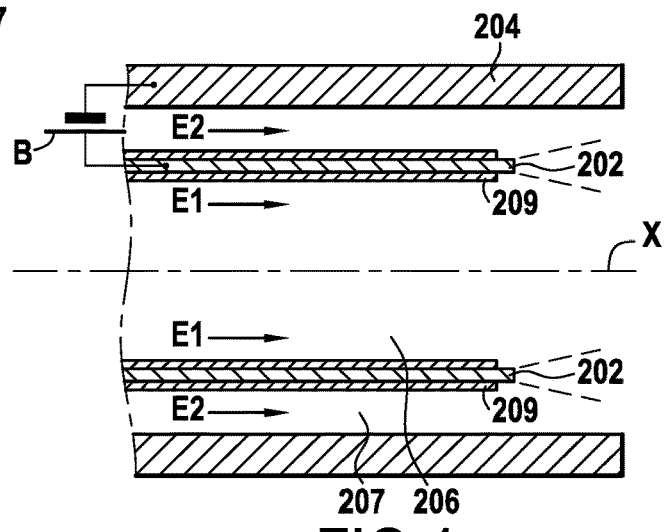
FIG. 4 is a fragmentary longitudinal section of an injector element in a second embodiment.

FIG. 4 shows a downstream portion of the injector element 201 in another embodiment. In this embodiment, the injector element does not have a central body. Nevertheless, in order to facilitate fabrication of the injector element 201, the injector element 201 could have a central body, possibly a body that is electrically inactive relative to the ignition device.

The second wall 204 has a second electrode, in this example a charged electrode, for igniting the mixture by electric discharge. The source B of electricity is connected between the first and second electrodes of the first and second walls 202 and 204. The first electrode of the first wall 202 is protected over substantially its entire length by an insulating sheath 209. The downstream end of the first electrode of the first wall 202 projects from the sheath 209 in order to enable electrical breakdown with the second electrode of the second wall 204. The operation of the injector element in this embodiment is similar to that described above.

In addition, since the first and second ducts 206 and 207 are both annular in this example, the dimensioning of the injector element 201 can easily be adapted to the total flow rate required for the propellants.

Although the above embodiments relate to injector elements that are coaxial, the same concept can equally well be applied to triply coaxial injector elements. Thus, in a variant that is not shown, the injector element 201 may comprise, at least in its terminal portion, three coaxial walls optionally around a central body 203 so as to form three coaxial ducts. In one possibility, the same propellant may flow in the radially innermost duct and in the radially outermost duct, while the other propellant flows in the intermediate duct.

In this variant, the first wall having the first electrode may be selected from the two walls that are the closest to the axis of the injector element, i.e. the two walls that are radially innermost, i.e. the two walls that are at the boundary between two ducts.

The injector element in any of the above-described embodiments can be used in a combustion chamber such as a main combustion chamber, a gas generator, or a pre-combustion chamber, also referred to as a pre-chamber.

Although the present invention is described with reference to specific embodiments, modifications may be made to those examples without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. An injector element for injecting a mixture of at least a first propellant and a second propellant into a combustion chamber, the injector element comprising a first tubular wall defining a first duct for injecting the first propellant, a central body situated in the first duct, the first wall surrounding the central body, and a second wall surrounding the first wall and defining, between the first and second walls, a second duct for injecting the second propellant, wherein the first wall comprises a first electrode and the central body comprises a second electrode for igniting the mixture by electric discharge, the first electrode and the second electrode being configured to generate an electric discharge immediately upstream from a zone where the first propellant and the second propellant mix together, wherein a downstream end of the second electrode is situated downstream with respect to a propellant injection direction from a downstream end of the first electrode.

2. The injector element according to claim 1, wherein the first electrode is a ground electrode.

3. The injector element according to claim 1, wherein the downstream end of the second electrode is plane transversely to the propellant injection direction.

4. The injector element according to claim 1, wherein the first duct and/or the second duct present a shape converging towards downstream from the injector element.

5. An injector comprising a plurality of injector elements according to claim 1.

6. A combustion chamber including at least one injector element according to claim 1.

7. A rocket engine comprising at least one combustion chamber according to claim 6.

8. The injector element according to claim 1, wherein a flame that results from igniting the mixture of at least the first propellant and the second propellant becomes attached on a downstream end of the first wall.

* * * * *